July 18, 1939.  W. LA HODNY ET AL  2,166,303
MIRROR
Filed June 3, 1937
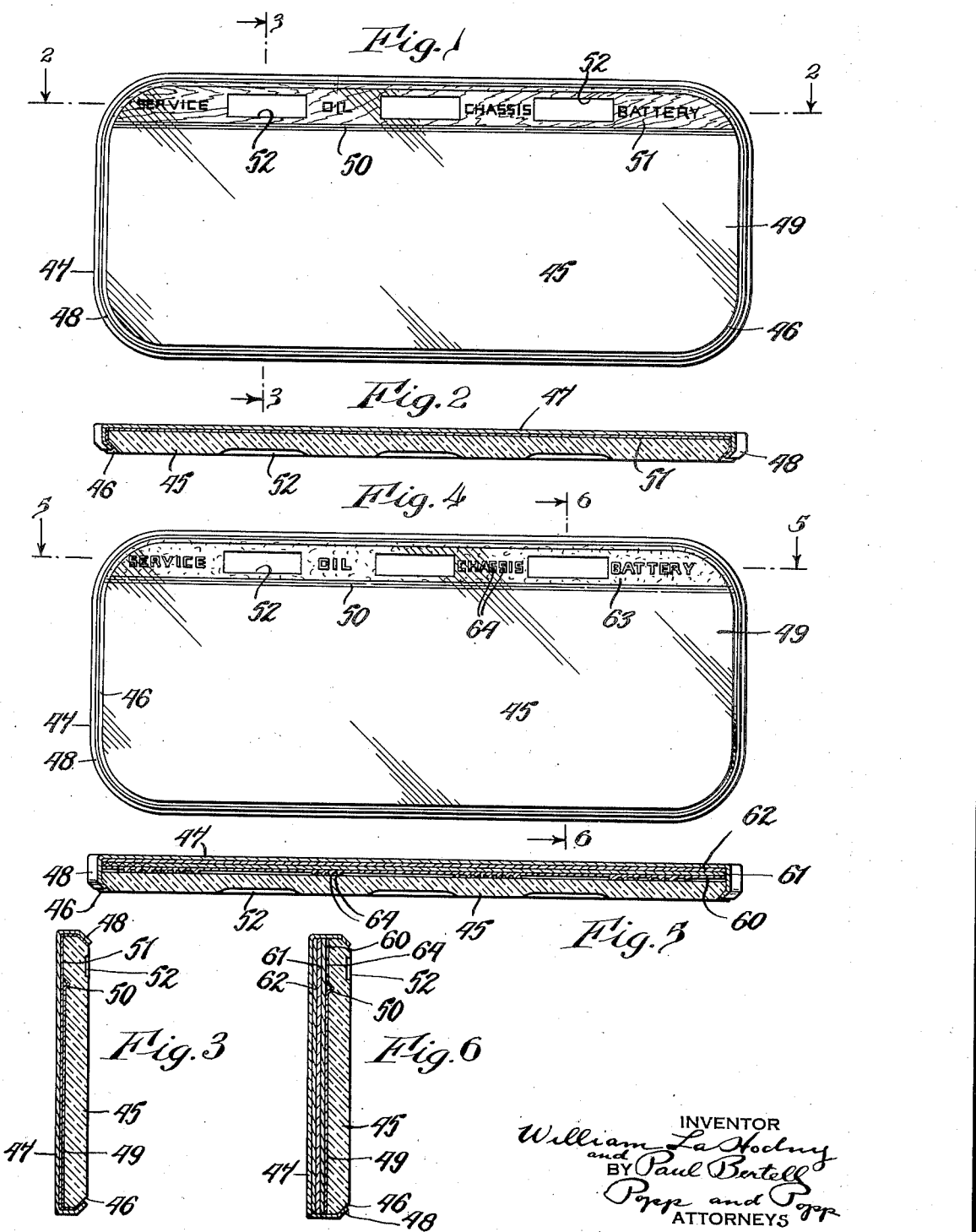

Patented July 18, 1939

2,166,303

UNITED STATES PATENT OFFICE 2,166,303

MIRROR

William La Hodny and Paul Bertell, Buffalo, N. Y., assignors to Standard Mirror Company, Buffalo, N. Y., a corporation of New York Application June 3, 1937, Serial No. 146,219

8 Claims. (Cl. 35—62)

This invention relates to a mirror and is shown as embodied in mirrors used in automobiles either as a vanity mirror adapted to be attached to the sun shield of an automobile or as a rear vision mirror adapted to be attached to the head bar of the windshield although the invention can be embodied in mirrors other than those used in automobiles.

One of the principal objects of the present invention is to provide such a mirror in which the glass has the appearance of being elaborately ornamented on its rear face but in which such ornamentation is in fact printed upon a card or upon the backing plate for the glass plate and this printing is in contact with the rear face of an unsilvered portion of the mirror. The printing can be produced upon the card or backing plate in any well-known manner and can comprise any colors and also include lettering, fine line work and printed imitations of other surfaces such as wood graining. By the simple expedient of placing an ornamented card or the like in rear of the unsilvered portion of a mirror it is possible to obtain ornamentation of finer workmanship than if it were attempted, for example, photographically to apply this same ornamentation directly on the rear face of the mirror and at the same time the mirror can be produced at a much lower cost since it is obviously much cheaper to employ printed cards than to reproduce the same matter on the glass panel itself.

Another object of the invention is to provide such a mirror which can be used for recording purposes by the provision of ground areas on the obverse face of the mirror which can be marked with pencil. By providing these areas by grinding, these areas can be produced with any desired roughness or tooth. In attempting to produce such areas by sand blasting the tooth of the areas can not be made fine enough to make a good writing surface.

In the accompanying drawing:—

Fig. 1 is a front elevation of a combined vanity mirror and travel and service record made in accordance with our invention.

Figs. 2 and 3 are sections taken on the correspondingly numbered lines in Fig. 1.

Fig. 4 is a view similar to Fig. 1 showing a modified form of rear vision mirror embodying our invention.

Figs. 5 and 6 are sections taken on the correspondingly numbered lines in Fig. 4.

The mirror shown in Figs. 1–3 is a rear vision mirror such as is adapted to be mounted in any suitable manner on the head bar of an automobile windshield, such rear vision mirrors being used to observe conditions in rear of the car. Such rear vision mirrors generally include a silvered glass panel and a backing plate which supports the glass panel, such backing plate generally having its edges spun around the edges of the panel so as to form a unitary structure. The present invention relates to ornamenting unsilvered portions of the glass panel in such manner that the ornamentation appears to be imprinted directly on the glass panel. In carrying out the invention such ornamentation can be printed on a card interposed between the glass panel and its backing plate so that the printed card is in contact with the unsilvered portion of the glass panel or such ornamentation can be photolithographically or otherwise produced directly on the backing plate so as to contact the unsilvered portion of the panel. The form of the invention shown in Figs. 1–3 illustrates the manner in which the printed matter can be produced directly on the metal backing plate, this form of the invention being shown as constructed as follows.

The glass panel 45 is shown as being beveled at its edges as indicated at 46 and the backing plate 47 as having its rim 48 spun around the edges of the glass panel. The glass panel is shown as being silvered as indicated at 49 up to a horizontal groove 50 provided in the rear of the glass panel a short distance below its upper margin. The area of the glass panel above this groove 50 is left unsilvered and discloses printing matter printed directly on the inside of the backing plate 47. The layer of ink or paint used to provide this printing is indicated at 51 and this printing is shown as being in the form of wood grain as illustrated in Fig. 1. It will be understood, however, that such ornamentation can be provided in many other forms. In addition this printing includes the legends "Service", "Oil", "Chassis" and "Battery", in spaced relation, across the top of the backing plate and between these legends grooves 52 are ground into the obverse face of the glass panel 45. It will be noted that the printed matter 51 contacts directly with the rear face of the unsilvered part of the glass panel 45 and therefore gives the impression of being painted or photographically reproduced on the glass panel itself.

The form of the invention shown in Figs. 4–6 is identical with that shown in Figs. 1–3 except that paper cards 60, 61 and 62 are interposed between the glass panel and the backing plate. In this form the printing, as in the preferred construction, is done on the paper card 60 and any design can be achieved. In addition the letters 64 form the legends "Service", "Oil", etc. are embossed so as to stand out from the body of the card, these letters contacting with the rear face of the glass panel and hence giving the appearance of being printed or photographically reproduced directly thereon. It will be understood that the number of cards 60, 61 and 62 will depend upon the particular conditions encountered. Thus it is desirable to have the printed card 60 made of comparatively thin material so as to be readily imprinted or embossed. The number, if any, of backing cards 61 and 62, will depend upon the nature of any supporting means (not shown) which may be attached to the inside of the metal backing plate 47. If such fastening means are employed the paper backing plates 61 and 62 are cut away to accommodate such fastening means.

From the foregoing it is apparent that the present invention provides a very simple and inexpensive method of ornamenting a mirror by the simple printing of a card or backing plate provided in rear of the mirror in contact with an unsilvered portion of the mirror. This expedient provides a very realistic imitation of ornamentation painted or photographically reproduced upon the glass plate itself. By employing ordinary printing this ornamentation can be produced at very low cost and can be produced in all of the colors and designs known to printers. Furthermore in the form of the invention shown in Figs. 1–4 the mirror can be easily applied to the sun shield and is securely held in position thereon and also provides a service record in which readily erasable notations can be made concerning mileage, gas consumption and other matters of interest to the driver.

We claim as our invention:

1. A mirror, comprising a glass panel having silvered and unsilvered portions, a flat backing member for said panel and bearing printed matter on its front face, and means non-adhesively holding said printed matter in contact with the rear face of said unsilvered portion of the glass panel whereby said printed matter is visible through said unsilvered portion and appears to be imprinted directly on said glass panel.

2. A mirror, comprising a glass panel having silvered and unsilvered portions, a flat backing member loosely applied to the rear face of said panel, said flat backing member bearing printed matter on its front face and means connecting said glass panel and backing member to hold said printed matter in contact with the rear face of said unsilvered portion of the glass panel whereby said printed matter is visible through said unsilvered portion and appears to be imprinted directly on said glass panel.

3. A mirror, comprising a glass panel having silvered and unsilvered portions, a flat backing member loosely applied to the rear face of said panel, said flat backing member bearing printed matter on its front face and means engaging a front face of said glass panel and holding said backing member with its printed matter in contact with the rear face of the unsilvered portion of said glass panel whereby said printed matter is visible through said unsilvered portion and appears to be imprinted directly on said glass panel.

4. A mirror, comprising a glass panel having silvered and unsilvered portions, a flat backing member extending from one edge of said panel to the opposite edge thereof and loosely applied to the rear face of said panel, said flat backing member bearing printed matter on its front face and means connecting said glass panel and backing member to hold said printed matter in contact with the rear face of said unsilvered portion of the glass panel whereby said printed matter is visible through said unsilvered portion and appears to be imprinted directly on said glass panel.

5. A mirror, comprising a glass panel having silvered and unsilvered portions, a flat backing member conforming in size and shape to said glass panel and loosely applied to the rear face of said panel, said flat backing member bearing printed matter on its front face and means at the registering margins of said panel and backing member for connecting said glass panel and backing member to hold said printed matter in contact with the rear face of said unsilvered portion of the glass panel whereby said printed matter is visible through said unsilvered portion and appears to be imprinted directly on said glass panel.

6. A mirror, comprising a glass panel having silvered and unsilvered portions, a backing plate for said panel, the edges of said backing plate being spun around the margin of said panel to form a unitary structure and a card loosely interposed between said backing plate and panel and bearing printed matter on its front face, said printed matter being held in contact with the rear face of said unsilvered portion of the glass panel by the backing plate whereby said printed matter is visible through said unsilvered portion and appears to be imprinted directly on said glass panel.

7. A mirror, comprising a glass panel having silvered and unsilvered portions separated by a groove provided in the rear face of said glass panel, a flat backing member loosely applied to the rear face of said panel, said flat backing member bearing printed matter on its front face and means connecting said glass panel and backing member to hold said printed matter in contact with the rear face of said unsilvered portion of the glass panel whereby said printed matter is visible through said unsilvered portion and appears to be imprinted directly on said glass panel.

8. A mirror, comprising a glass panel having silvered and unsilvered portions separated by a groove provided in the rear face of said glass panel, a backing plate for said panel, the edges of said backing plate being spun around the margin of said panel to form a unitary structure and a card loosely interposed between said backing plate and panel and bearing printed matter on its front face, said printed matter being held in contact with the rear face of said unsilvered portion of the glass panel by the backing plate whereby said printed matter is visible through said unsilvered portion and appears to be imprinted directly on said glass panel.

WILLIAM LA HODNY.
PAUL BERTELL.